United States Patent [19]
Kliman et al.

[11] Patent Number: 6,029,336
[45] Date of Patent: *Feb. 29, 2000

[54] METHOD OF FABRICATING A PERMANENT MAGNET LINE START MOTOR HAVING MAGNETS OUTSIDE THE STARTING CAGE

[75] Inventors: Gerald Burt Kliman, Schenectady; Mark Alan Preston, Niskayuna; Donald Wayne Jones, Burnt Hills, all of N.Y.

[73] Assignee: General Electric Company, Schenectady, N.Y.

[*] Notice: This patent issued on a continued prosecution application filed under 37 CFR 1.53(d), and is subject to the twenty year patent term provisions of 35 U.S.C. 154(a)(2).

[21] Appl. No.: 08/503,344

[22] Filed: Jul. 17, 1995

Related U.S. Application Data

[62] Division of application No. 08/228,784, Apr. 18, 1994, abandoned.

[51] Int. Cl.[7] .................................................. H02K 15/04
[52] U.S. Cl. .............................. 29/598; 29/608; 310/42; 310/43; 310/156
[58] Field of Search ...................... 29/598, 608; 310/42, 310/43, 211–214, 156

[56] References Cited

U.S. PATENT DOCUMENTS

| | | |
|---|---|---|
| 2,015,554 | 9/1935 | Fisher . |
| 2,386,673 | 10/1945 | Fisher . |
| 2,710,931 | 6/1955 | Tittel et al. . |
| 3,126,493 | 3/1964 | Honsinger . |
| 3,891,879 | 6/1975 | Yamada et al. . |
| 4,127,786 | 11/1978 | Volkrodt ................................. 310/156 |
| 4,139,790 | 2/1979 | Steen . |
| 4,327,302 | 4/1982 | Hershberger ............................ 310/156 |
| 4,358,697 | 11/1982 | Liu et al. ................................ 310/156 |
| 4,454,438 | 6/1984 | Yamashita et al. ..................... 310/162 |
| 4,568,846 | 2/1986 | Kapadia .................................. 310/156 |
| 4,642,502 | 2/1987 | Carpenter et al. . |
| 4,738,020 | 4/1988 | Neuenschwander ..................... 29/598 |
| 4,843,271 | 6/1989 | Shah . |
| 4,922,152 | 5/1990 | Gleghorn et al. ....................... 310/156 |
| 4,939,398 | 7/1990 | Lloyd ...................................... 310/156 |
| 4,954,736 | 9/1990 | Kawamoto et al. . |
| 5,345,130 | 9/1994 | Kliman et al. .......................... 310/156 |

FOREIGN PATENT DOCUMENTS

| | | |
|---|---|---|
| 0569594 | 11/1993 | European Pat. Off. . |
| 3429813 | 2/1986 | Germany . |
| 3527035 | 2/1987 | Germany . |
| 3609750 | 9/1987 | Germany . |
| 57-080252 | 5/1982 | Japan . |
| 63-036507 | 2/1988 | Japan . |
| 04197064 | 7/1992 | Japan . |

OTHER PUBLICATIONS

Dietmar Weinmann, "Applications of NdFeB–Magnets in Motors" from *Revue Generale De L'Electricite* No. 4, Apr. 1991, pp. 45–51.

Tomsk Poly, "Sync. Motor with Constant Magnets—Has Rotor in Form of Parts Alternating in Axial Direction" Section EI, Week 9145, Jan. 2, 1992, Derwent Publications Ltd. SU–A–1 631 672.

*Primary Examiner*—Carl E. Hall
*Attorney, Agent, or Firm*—Ann M. Agosti; Jill M. Breedlove

[57] ABSTRACT

A rotor for use in a line start permanent magnet motor comprises a rotor core having a shaft and including teeth defining slots; a rotor cage, at least a portion of which extends through the slots; and a layer of composite permanent magnet material at least partially coating the rotor core.

3 Claims, 7 Drawing Sheets

METHOD OF FABRICATING A PERMANENT MAGNET LINE START MOTOR HAVING MAGNETS OUTSIDE THE STARTING CAGE

This application is a division of application Ser. No. 08/228,784 filed Apr. 18, 1994, now abandoned.

BACKGROUND OF THE INVENTION

1. Field of the Invention

This invention relates generally to line start permanent magnet motors and, more specifically to line start motors having magnets outside starting cages and magnetization of such motors.

2. Description of the Related Art

Conventional line start permanent magnet motors are designed with the magnets inside the induction starting cage. In these motors, large block magnets can be used. The magnets inside the cage are only partially protected from demagnetization during starting (when the rotor flux can be 180 degrees out of phase with the stator flux at very high current levels). When the line voltage at full frequency is applied to a stopped motor winding, the air gap magnetic field revolves very rapidly past the stationary rotor magnets and thus (although strong pulsating torques exist) develops no net torque. The motor is instead started by currents flowing in the starting cage exactly as in an induction motor. Resulting induction torques, however, are not always high enough to start some motors because the induction cage is magnetically interrupted and often electrically interrupted as well. Additionally, the stator flux must traverse the thickness of the magnets which is usually considerably larger than the air gap and behaves similarly. The result is poor performance as an induction motor. After this type of conventional motor is started and synchronized, little or no current flows in the induction cage.

In these permanent magnet motors, the cage torque must overcome the "drag" loading of the magnets in addition to the load. This drag has two components, both of which vary with speed and air gap flux density. The first drag component is from the stator core losses that are induced by the rotating flux of the magnets which varies with the square of speed and air gap flux density. The second drag component is the torque which results from the voltages induced in the stator windings by the rotating flux of the magnets which also vary with the square of the air gap flux density and as a function of speed. Because the frequency of the resultant voltage in the stator windings does not equal the line frequency, the power system appears to the stator as a short circuit. Hence current flows in the stator, and power is dissipated in the stator windings as a result.

Moreover, the rotor cage can never be fully magnetically uniform and complete because that would "short circuit" the magnetic flux of the magnets allowing little or no magnetic flux to reach the air gap for interaction with the stator currents. One method of avoiding a magnetic short circuit is to extend the slots in the rotor down towards the magnets to create a "flux barrier." The result is that the cage does not produce torque as effectively as it would if complete. The flux barrier to induction flux represented by the magnet is another major factor in degrading cage performance. Thus, fabricating a flux barrier permanent magnet motor with inside magnets results in an ineffective induction motor.

SUMMARY OF THE INVENTION

An object of the present invention is to provide simplified manufacturing of a line start permanent magnet motor with improved induction motor starting performance.

Briefly, in accordance with a preferred embodiment of the present invention, a rotor for use in a line start permanent magnet motor comprises a rotor core having a shaft and including teeth defining slots; a rotor cage, at least a portion of which extends through the slots; and a layer of permanent magnet material at least partially coating the rotor core. Thus the induction cage is magnetically and electrically complete.

In accordance with another preferred embodiment of the present invention, a method of fabricating a rotor for use in a line start permanent magnet motor comprises laminating a rotor core; forming teeth defining slots in the rotor core; positioning a rotor cage within the slots; and applying a layer of composite permanent magnet material over at least a portion of the rotor core.

BRIEF DESCRIPTION OF THE DRAWINGS

The features of the invention believed to be novel are set forth with particularity in the appended claims. The invention itself, however, both as to organization and method of operation, together with further objects and advantages thereof, may best be understood by reference to the following description taken in conjunction with the accompanying drawings, where like numerals represent like components, in which:

DETAILED DESCRIPTION OF A PREFERRED EMBODIMENT OF THE INVENTION

Figure 1:
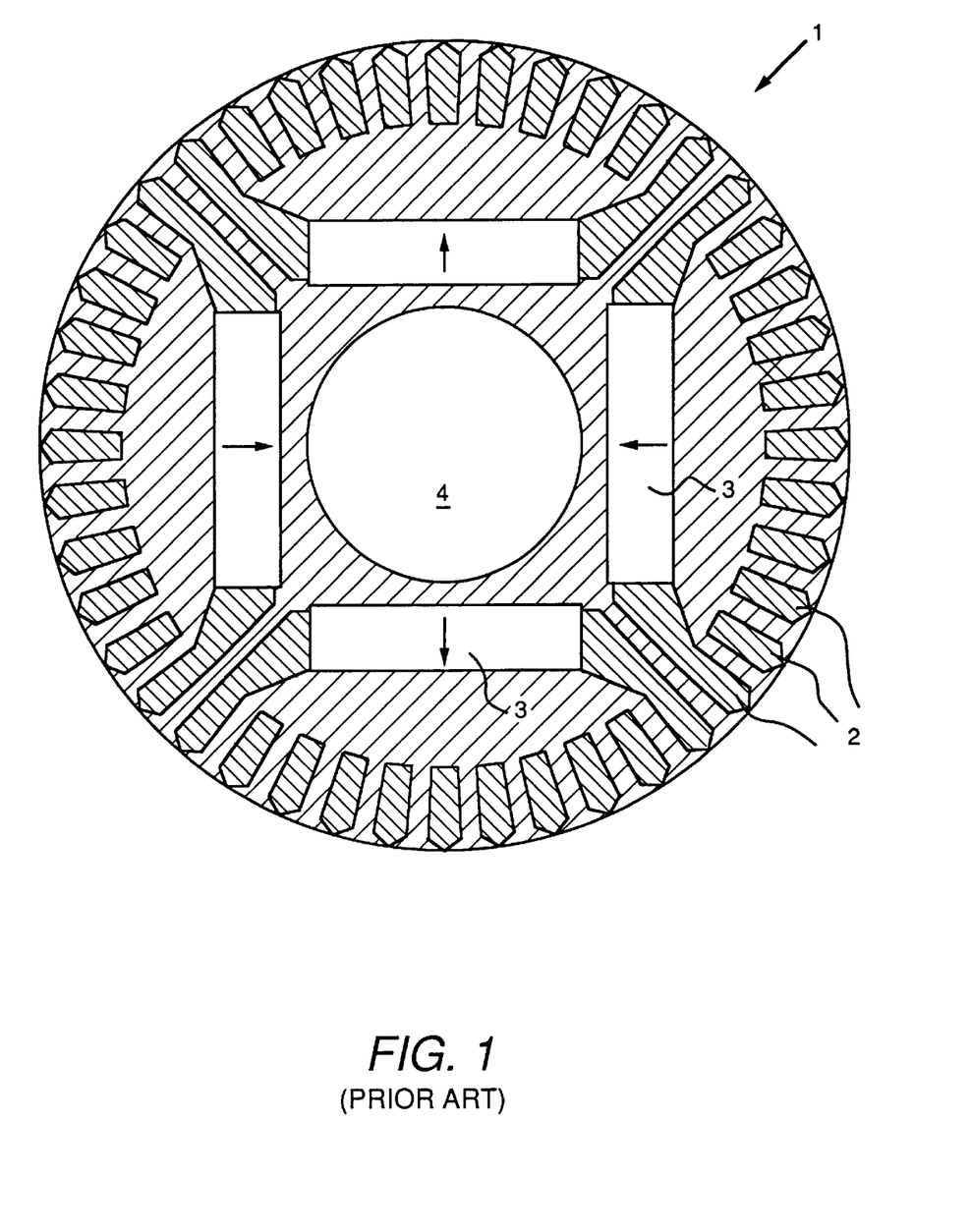
FIG. 1 is a sectional side view of a rotor for a conventional line start permanent magnet motor.

FIG. 1 is a sectional side view of a rotor 1 having a shaft 4 for a conventional line start permanent magnet motor wherein a plurality of magnets 3 are positioned inside an induction starting rotor cage 2.

Figure 2:
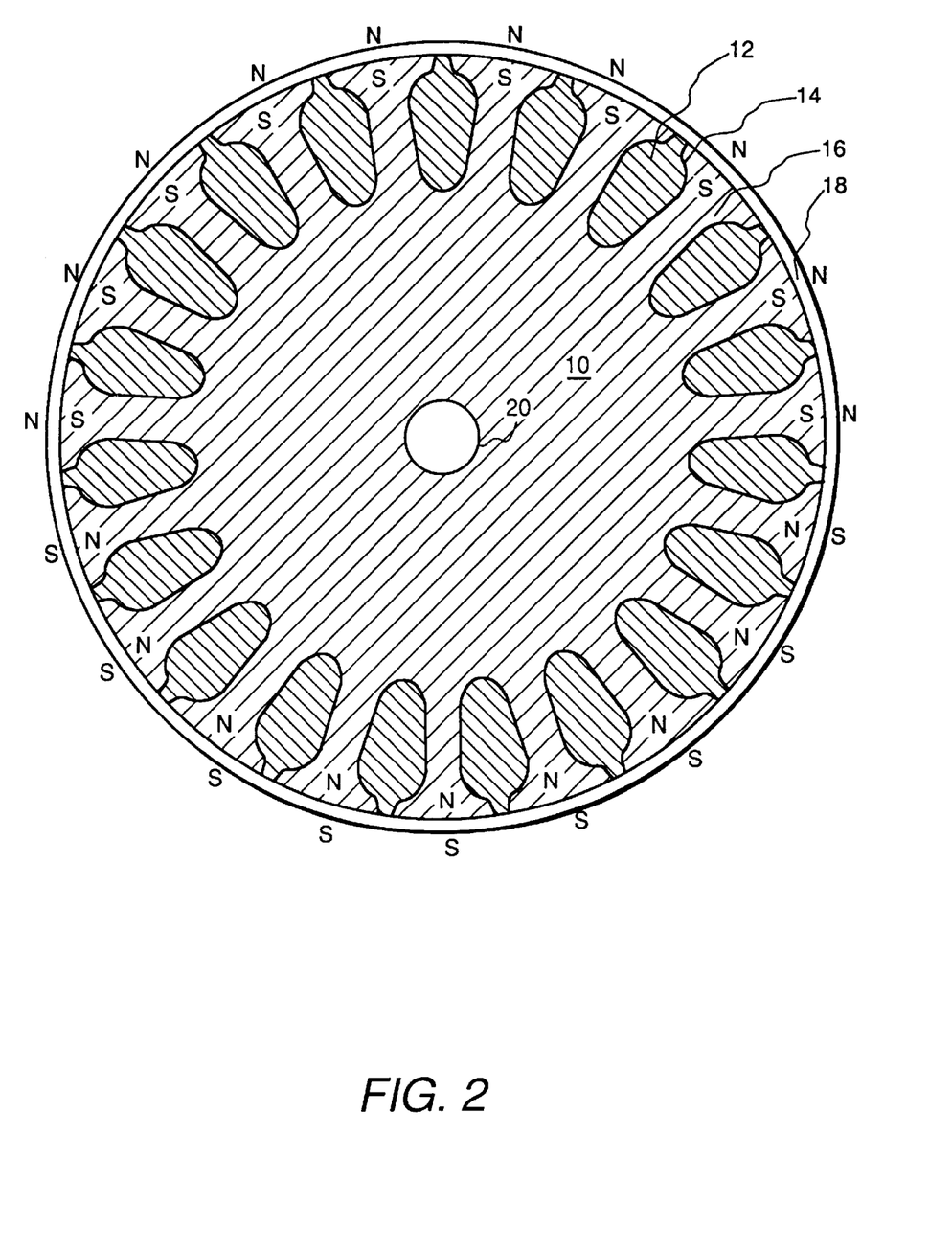
FIG. 2 is a sectional side view of an embodiment of a rotor of the present invention.

FIG. 2 is a sectional side view of an embodiment of a rotor core 10 of the present invention having a shaft 20 and teeth 16 defining slots 14 for placement of a rotor cage 12 (a short-circuited rotor winding). In this embodiment rotor 10 is a conventional induction motor rotor which is coated with a thin magnetized layer of high energy composite permanent magnet material 18. The manufacturing process is therefore much simpler than that of conventional PM synchronous motors. In one embodiment the thickness of the layer of permanent magnet material is about 1/64 of an inch, for example which could yield as much as 4000 gauss in the air gap of a small motor. The rotor typically comprises several hundred laminations of metal sheets such as iron or steel with slots 14 punched therethrough. An example of a permanent magnet material 18 which can be used in this embodiment includes, for example, MagneQuench™ (a trademark of the Delco Division of General Motors) flakes or ferrite powder in an epoxy or plastic matrix.

With permanent interior magnets, skewing (twisting the rotor laminations to improve rotor performance) is impractical because the interior magnets would be hard to insert after skewing and would be broken if inserted prior to skewing. The rotor laminations of the present invention, however, can easily be skewed before molding of the permanent magnet material without compromising the magnet.

Rotor cage 12 typically comprises a metal such as aluminum, for example. The rotor cage is preferably formed in slots 14 prior to the molding of permanent magnet material 18. Slots 14 can either be open (with the permanent magnet material in physical contact with the rotor cage), as shown in FIG. 2, or closed (with the permanent magnet material separated from the rotor cage by a thin web of the rotor core), as shown in FIGS. 4d–4e.

Because the rotor of FIG. 2 has a minimized induction gap and minimal magnet leakage flux, it does not need the flux barrier that is typically required in conventional interior permanent magnet motors to avoid a magnetic "short circuit." Thus the motor can provide full induction cage performance with no compromise except for the added air gap of the magnet.

Figure 3:
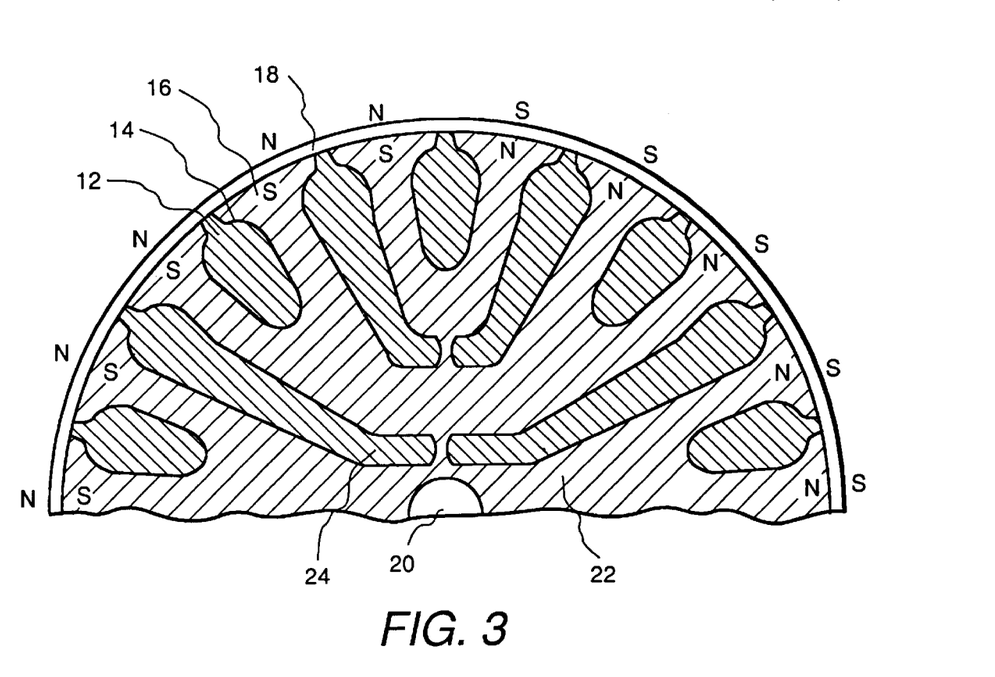
FIG. 3 is a partial view similar to that of FIG. 2 wherein slots of the rotor extend inward towards a rotor shaft.

FIG. 3 is a partial view similar to that of FIG. 2 in which a flux barrier rotor 22 is used to add reluctance torque. The use of flux barriers 24 in a rotor compensates for the fact that in the embodiment of FIG. 2 there is no reluctance torque (which in many permanent magnet motor designs can be equal to the magnet torque in importance) to add to the magnet torque at synchronous speed. However this configuration again introduces a magnetic interruption in the cage and degrades induction motor starting action. The configuration shown in FIG. 3 is one of a wide variety possible and can, in fact, be a conventional reluctance rotor such as the Siemens-Allis Corporation's Synduction™ motor (a combination of synchronous and induction motors). In effect, a permanent magnet material is coated on a conventional line start reluctance motor wherein selected slots 24 of the rotor extend inward towards rotor shaft 20.

FIGS. 4a–4e are partial sectional side views of additional embodiments of rotor slots 14 and magnet strips 30 in the present invention. When a layer of permanent magnet material is coated on a rotor, the thickness of the air gap 28 between rotor 10 and a stator 26 is effectively increased since permanent magnet material typically has a permeability of about 1. This added air gap can be substantially reduced by allowing rotor teeth 16 to have vertical side edges 40 extending through the permanent magnet material layer as shown in FIGS. 4a–4e and thus reducing the effective air gap and substantially improving the starting performance. Side edges 40 can be punched into the rotor core at the same time slots 14 are formed. In these embodiments, the layer of permanent magnet material 18 (shown in FIG. 2) comprises a plurality of substantially parallel magnet strips 30 between side edges 40 of teeth 16.

Figure 4A:
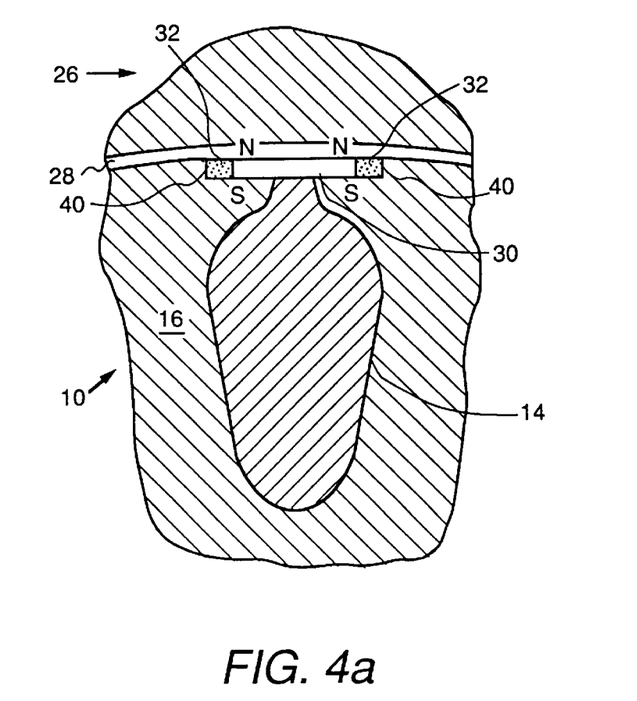
FIGS. 4a–4e are partial sectional side views of additional rotor embodiments of the present invention.

In the view shown in FIG. 4a, space is left between a magnet strip 30 and the respective pair of teeth 16 to act as a barrier for reducing the leakage flux from the magnet strips to the teeth. This space can be filled with an epoxy or plastic filler material 32 to maintain proper magnet strip dimensions and to help bind the magnet strips to the rotor. Both the magnet strips and the filler material can be placed by molding because the volume fraction of the magnetic material of the magnet as compared to the total material of the magnet (which includes epoxy or plastic) will be quite moderate, especially when the magnet strips comprise a material such as MAGNEQUENCH powder NdFeB (neodymium iron boron) bonded magnet material (MAGNEQUENCH is a trademark of General Motors Corporation).

Figure 4B:
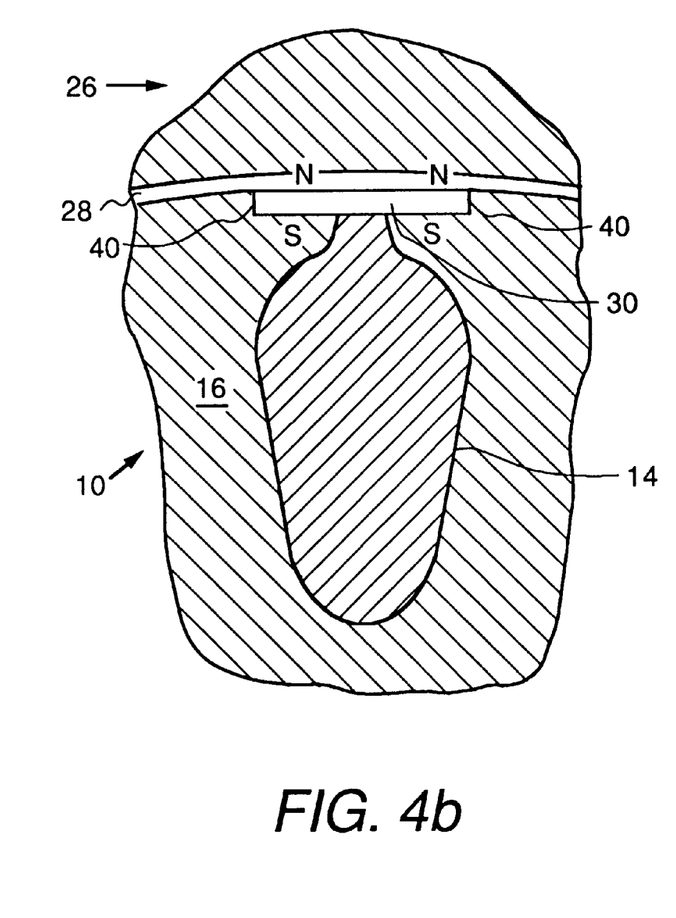

In the view shown in FIG. 4b, the magnet strip fills the entire space between the side edges of teeth 16. The manufacturing process is thus simpler than that of the embodiment of FIG. 4a, but has the disadvantage that the sides of the magnet strip in FIG. 4b supply leakage flux to the sides of the teeth. The total useful flux, however, will be increased.

Figure 4C:
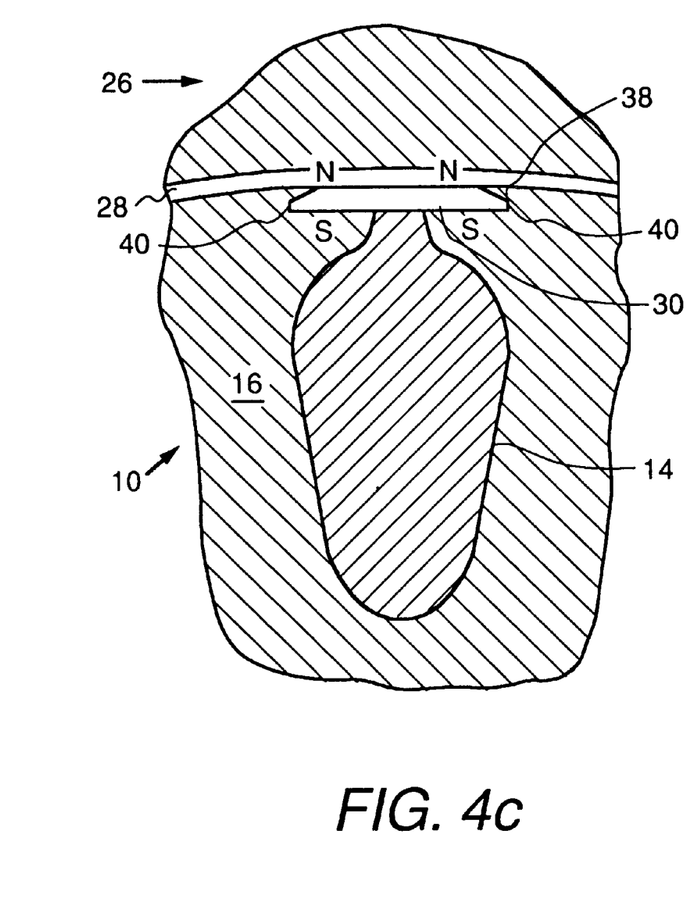
Figure 4D:
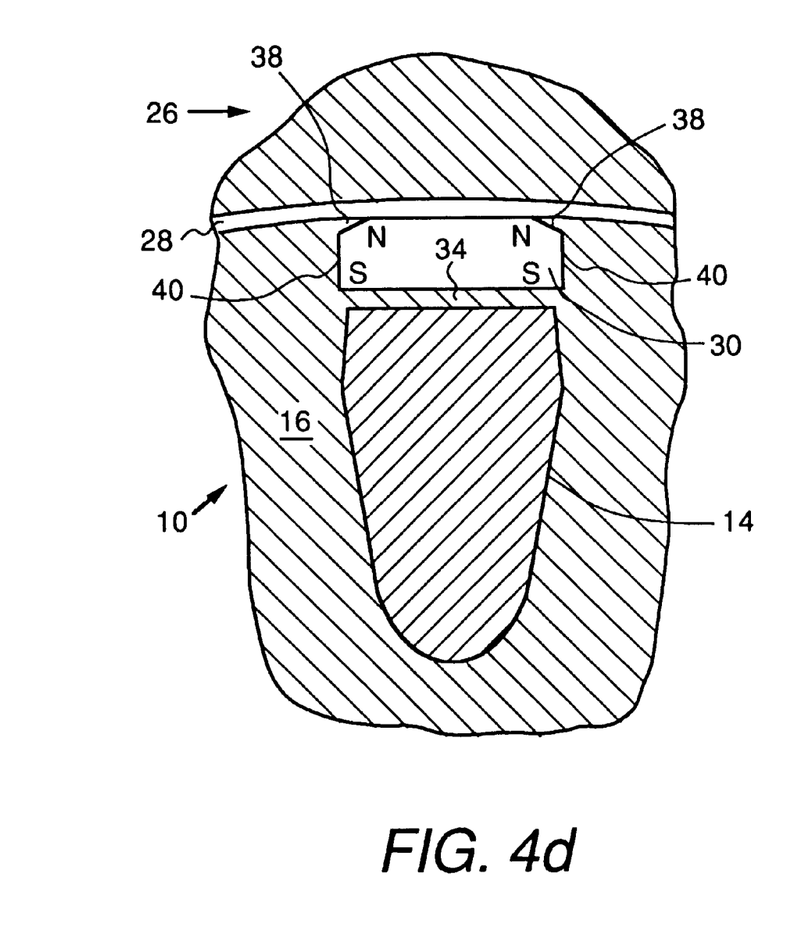
Figure 4E:
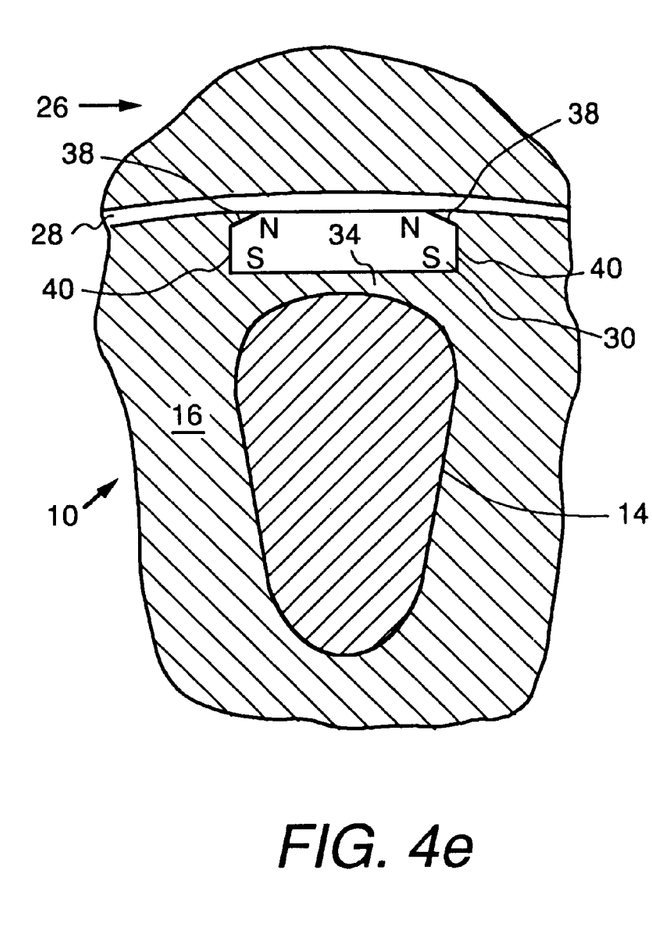

A mechanically more secure molded magnet structure can be attained, at the cost of more leakage flux, by forming tooth overhangs 38 during the process of punching slots 14 and side edges 40 such that a pair of side edges 40 of teeth 16 are at least partially slanted towards one another, as shown in FIG. 4c.

Several additional examples of magnet strip and tooth configurations are shown in in FIGS. 4d–4e. In the embodiment of FIG. 4d, a thin web 34 of lamination of rotor 10 is present between each magnet strip and each respective slot to keep the typically cast rotor cage in slots 14 and magnet strips 30 separate without requiring a cleaning operation. The widest portion of web 34 need only be about 0.022 inches to saturate. An advantage of this embodiment of separating permanent magnet material 30 from slots 14 is that the high temperature aluminum casting operation can be done first, in the normal way, with little or no leakage of metal into the space reserved for the permanent magnet material.

Another advantage of the embodiment of FIG. 4d is that the thin web provides a path for the magnet flux to reach tooth 16. Due to the low flux density of the permanent magnet compared to the saturation flux density of the rotor, only a very thin web of lamination is needed. The armature reaction flux will be demagnetizing under some conditions, but, unlike the conventional interior permanent magnet motor, the armature reaction flux will avoid the magnets and flow preferentially in the teeth.

By making the web as thin as possible the web will just carry the no load magnet flux and be close to saturation. This will also provide significant protection to the magnets against demagnetization while pole slipping, because saturation of the web will limit the armature reaction flux that can go through the magnets. In one embodiment, the magnets are about 0.205 inches wide and about 0.057 inches thick. Electromagnetically the magnet strips can afford to be thinner and still yield adequate flux between the stator and rotor. This will provide more slot area and a cheaper magnet. During or after cooling, the rotor can be dipped, or impregnated with varnish, for example, to take up any looseness as a result of shrinkage and to seal the rotor against moisture absorption.

In the embodiment of FIG. 4e, web 34 a of lamination is thin towards the center of a respective magnet strip 30 and thicker closer to the outer edges of the respective magnet strip. This embodiment is especially useful when the magnet strips are to be magnetized after positioning in the rotor. Approximately 20,000 Oe (oersteds) will be required to fully magnetize bonded neo (NdFeB) magnets, so the web of lamination must be capable of handling magnet flux densities of about 2.5 times normal and therefore must be thicker at the outer edges. Furthermore, some adjustment of the web thickness is useful for accommodating the slot leakage flux which will be aiding on one side of a slot and opposing on the other side of a slot during motor start or transient recovery from an increased load.

Figure 5A:
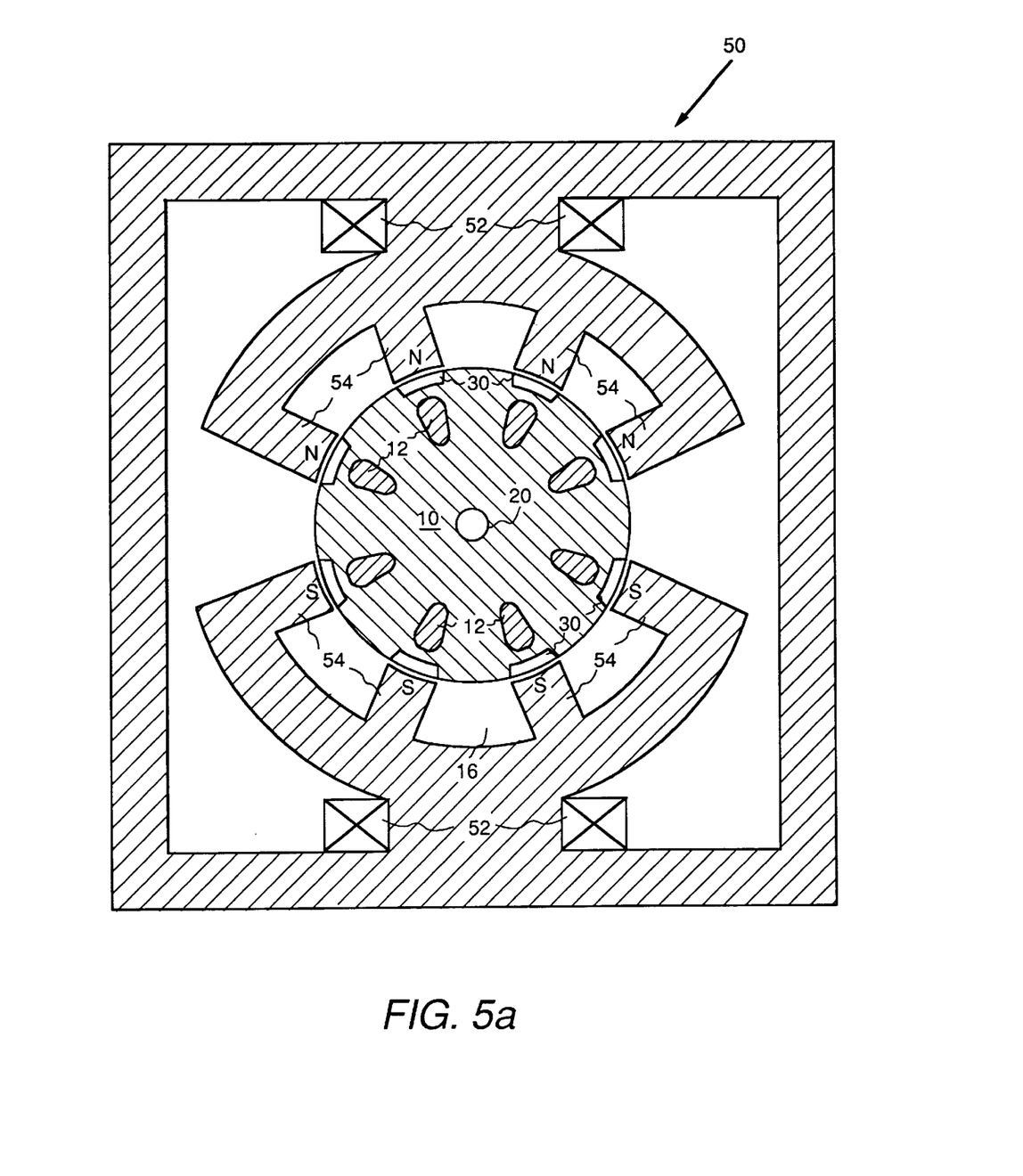
FIGS. 5a–5c are sectional side views of magnetizing fixtures for the rotor embodiments of the present invention.
Figure 5B:
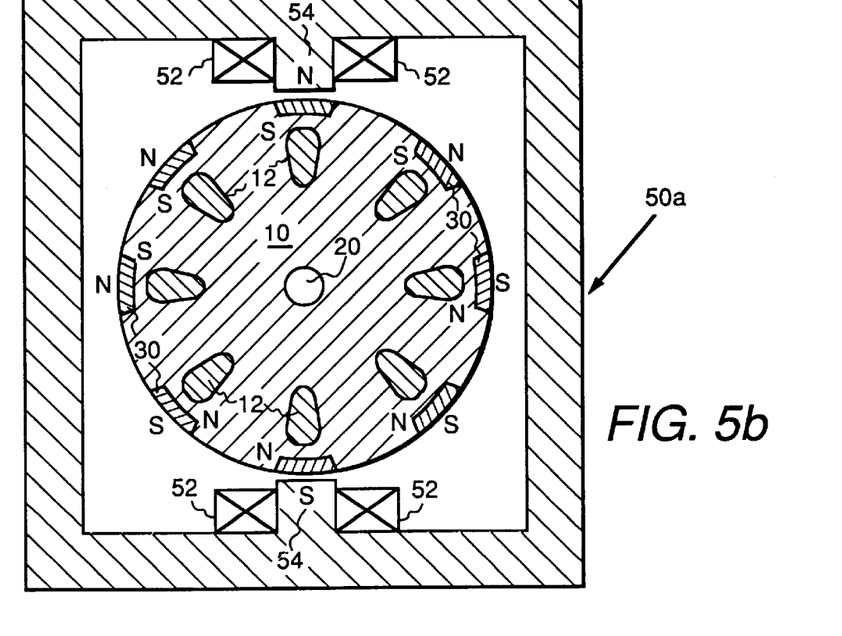
Figure 5C:
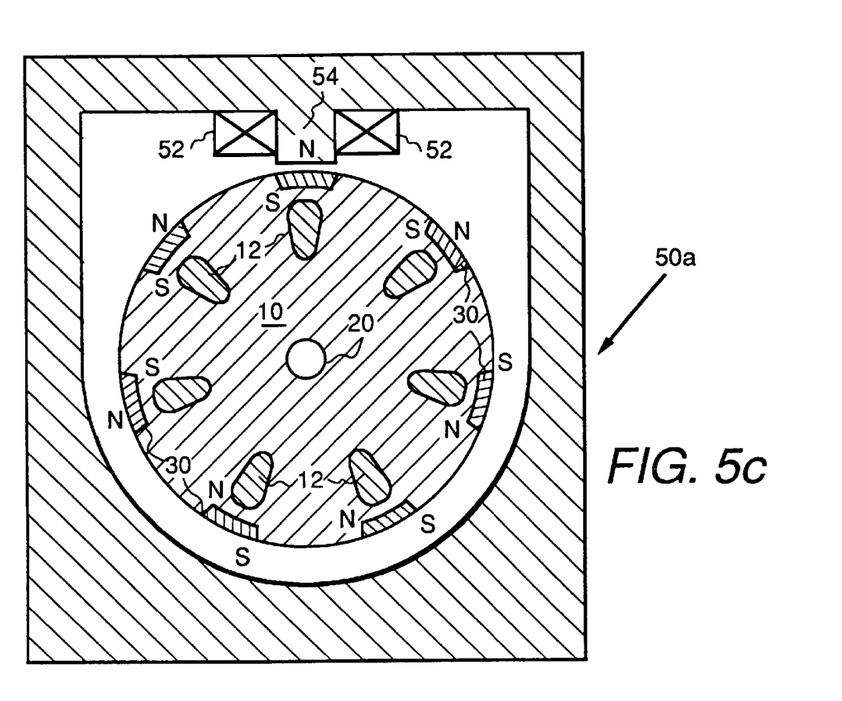

FIGS. 5a–5c are sectional side views of preferred magnetizing fixtures for the rotor embodiments of the present invention. Special fixtures are desirable for the slot embodiments of FIGS. 4a–4e because the magnetic flux would flow through rotor teeth 16 if some types of conventional fixtures were used. The embodiments of FIGS. 2 and 3 can be magnetized with either a conventional fixture or a fixture shown in FIGS. 5a–5c. Alternatively, the embodiments of FIGS. 2–4e can be magnetized by using customized windings in an electronically commutated motor (ECM) magnetizer.

FIG. 5a is a magnetizing fixture 50 for a two pole motor. Magnetizing fixture 50, which may comprise a magnetically conductive material such as iron or steel for example, includes fingers 54, which are substantially aligned with respective ones of magnet strips 30, and exciting coils 52, which supply magnetic flux through the fingers. There will be little or no leakage between the fingers of the fixture since they are close in magnetic potential. The air gaps and/or length of finger can be adjusted to balance the magnets.

Alternatively the magnet strips can be energized two at a time as shown in FIG. 5b. The magnetization fixture 50a of FIG. 5b, which has two excitation coils 52 and two fingers 54, is a more flexible fixture than the magnetization fixture of FIG. 5a because it can be used with a wider range of rotors having different numbers of slots and different types of slot dimensions. After the first set of magnet strips has been magnetized, rotor 10 can be rotated to magnetize the remaining sets of magnet strips. The magnetization fixture 50b of FIG. 5c uses only one finger 54 and one excitation coil 52. An advantage to this embodiment is that an odd number of magnet strips 30 can be more easily magnetized.

When the magnet strips are bonded NdFeB, their physical properties will be similar to slot wedges. The thickness, which in one embodiment is about 1/16 of an inch, makes extrusion and handling of free standing strips practical. As an alternative to using a special fixture, these strips can be externally pre-magnetized and then fed into the rotor in the same way that slot liners and wedges are inserted with automatic machinery.

While only certain preferred features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. A method of fabricating a rotor for use in a line start permanent magnet motor, comprising the steps of:

assembling a rotor core having teeth defining slots in said rotor core, the teeth having side edges;

positioning a rotor cage within said slots; and molding a plurality of substantially parallel permanent magnet strips between respective pairs of said side edges.

2. The method of claim 1, further including the step of applying plastic filler material between at least some of said magnet strips and respective pairs of said side edges after applying said magnet strips.

3. A method of fabricating a rotor for use in a line start permanent magnet motor, comprising the steps of:

assembling a rotor core having slots and having teeth defining side edges which are separated from the slots by material of the rotor core and extend to an outer perimeter of the rotor core;

positioning a rotor cage within said slots; and applying a plurality of substantially parallel permanent magnet strips between respective pairs of said side edges.

* * * * *